A. G. CRIPPS.
HEATING BOILER.
APPLICATION FILED JUNE 1, 1909.

969,137.

Patented Aug. 30, 1910.
3 SHEETS—SHEET 1.

WITNESSES:
Theresa Suenne
Clare Liggett

INVENTOR.
Alfred G. Cripps
BY
John H. Kinealy
ATTORNEY.

A. G. CRIPPS.
HEATING BOILER.
APPLICATION FILED JUNE 1, 1909.

969,137.

Patented Aug. 30, 1910.
3 SHEETS—SHEET 2.

WITNESSES:
Theresa Suenen
Clare Liggett

INVENTOR.
Alfred G. Cripps
BY
John H. Kinealy.
ATTORNEY.

A. G. CRIPPS.
HEATING BOILER.
APPLICATION FILED JUNE 1, 1909.

969,137.

Patented Aug. 30, 1910.
3 SHEETS—SHEET 3.

WITNESSES:
Theresa Sueme
Clare Liggett

INVENTOR.
Alfred G. Cripps
BY
John H. Kinealy
ATTORNEY.

UNITED STATES PATENT OFFICE.

ALFRED G. CRIPPS, OF AKRON, OHIO, ASSIGNOR TO PRUDENTIAL HEATING COMPANY, OF AKRON, OHIO, A CORPORATION OF OHIO.

HEATING-BOILER.

969,137. Specification of Letters Patent. Patented Aug. 30, 1910.

Application filed June 1, 1909. Serial No. 499,480.

*To all whom it may concern:*

Be it known that I, ALFRED G. CRIPPS, a citizen of the United States, residing at Akron, in Summit county and the State of Ohio, have invented a new and useful Improvement in Heating-Boilers, of which the following is a full, clear, and exact specification, reference being had to the accompanying drawings, which form a part thereof.

My invention relates to sectional heating boilers, and especially to that type of sectional heating boilers provided with two grates, a down draft and an up draft grate.

The object of my invention is to provide a sectional boiler comprising joined end and intermediate sections with vertical side water legs, and a down draft grate formed of hollow grate bars suspended from the upper parts of said intermediate sections by dependent water legs inside of said side water legs; and a further object of my invention is to provide a sectional boiler comprising joined end and intermediate sections with vertical side water legs, and a down draft grate formed of hollow grate bars suspended from the upper parts of said intermediate sections by dependent water legs inside of said side water legs, said hollow grate bars and dependent water legs being made integral with said sections and being provided with drain connections whereby a circulation of water is maintained in each section between said dependent water legs and said side water legs.

My invention is fully shown in the accompanying drawings where similar letters are used to designate similar parts.

Figure 1:
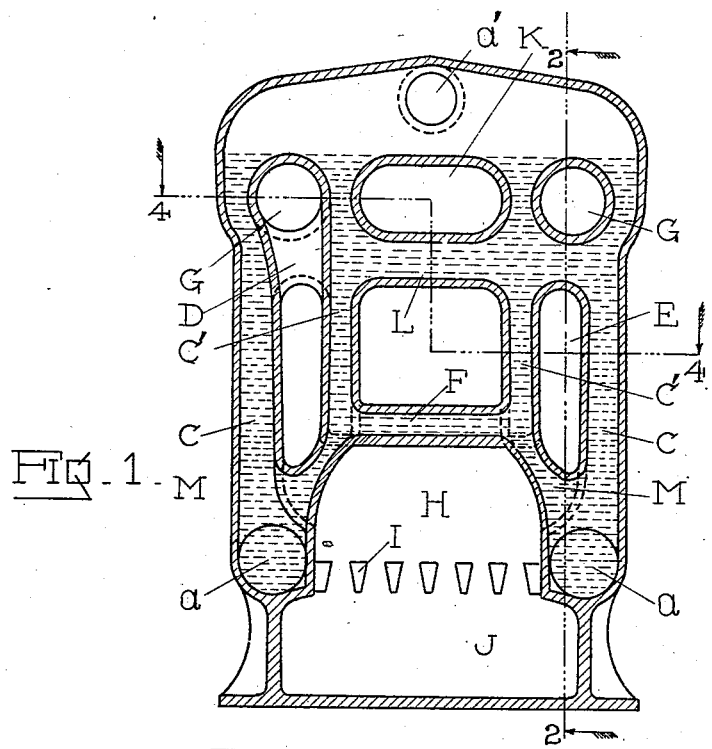
Figure 2:
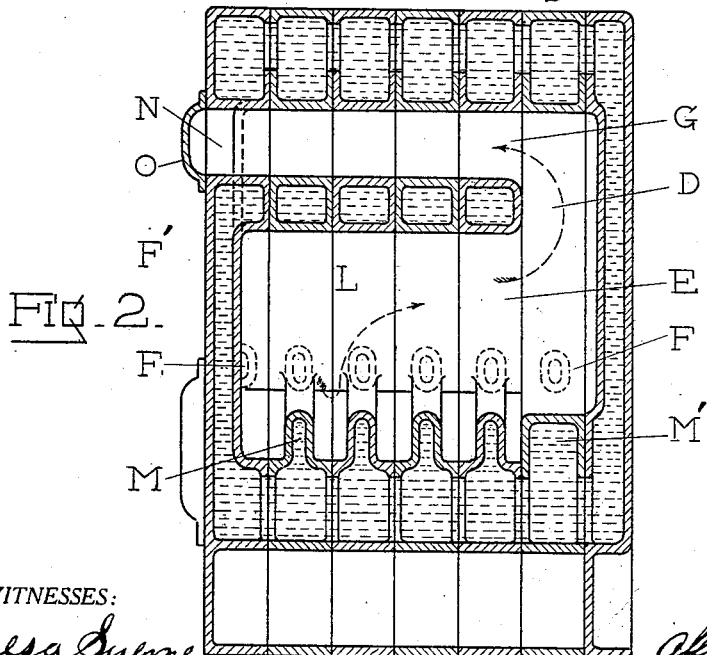
Figure 3:
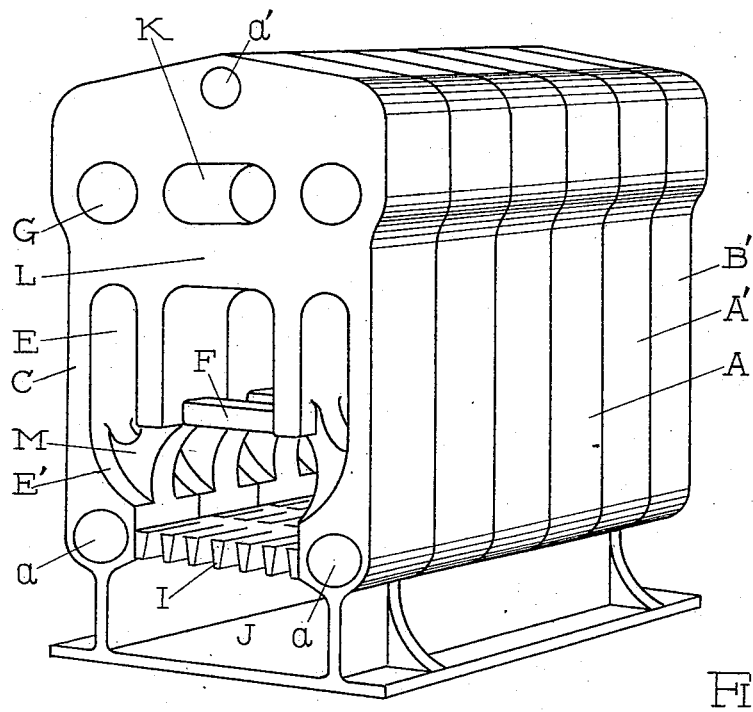
Figure 4:
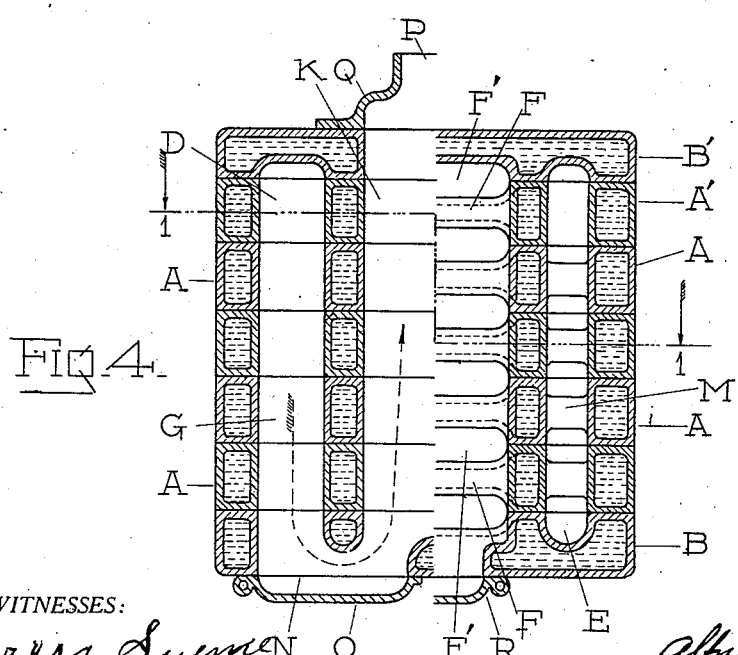
Figure 5:
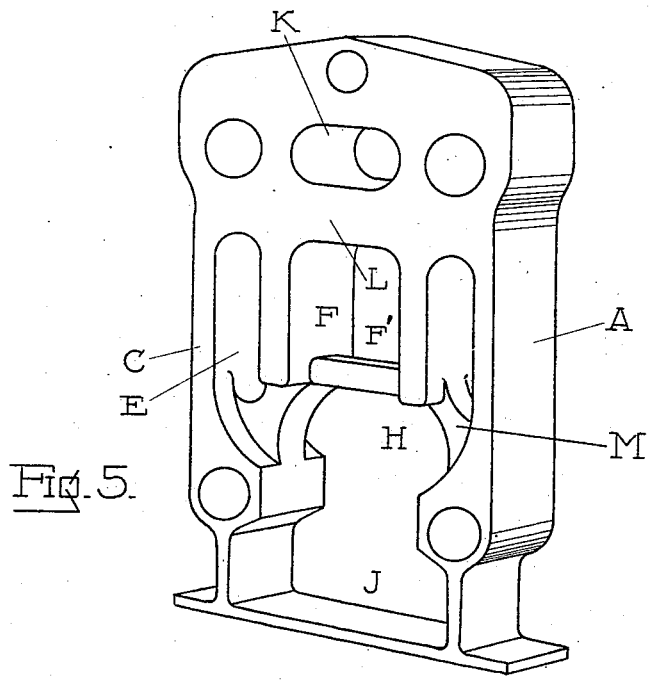
Figure 6:
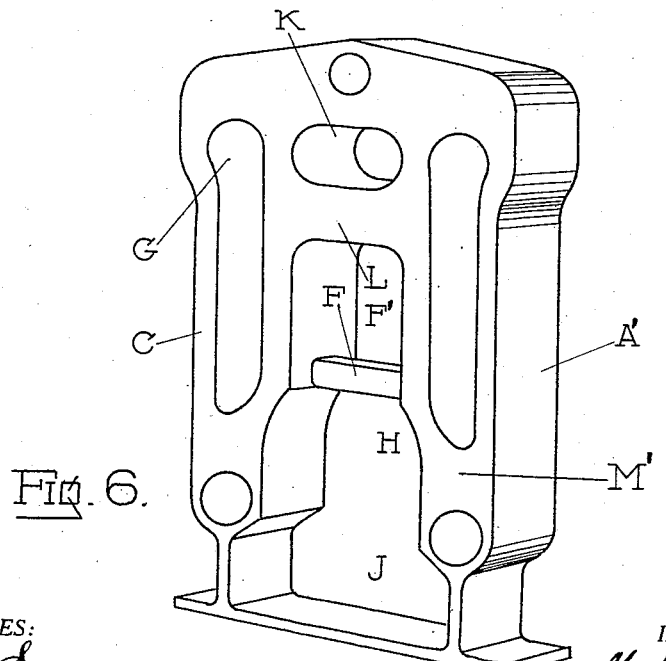

Figure 1 is a vertical section along the line 1—1 of Fig. 4; Fig. 2 is a vertical section along the line 2—2 of Fig. 1; Fig. 3 is a perspective view of a boiler with the front end section removed; Fig. 4 is a horizontal section along the line 4—4 of Fig. 1; and Figs. 5 and 6 are perspectives showing in detail the construction of sections which enter into the boiler.

Referring to the figures, A is an intermediate section, B and B' front and rear end sections, respectively, and A' a connecting section between the intermediate sections A and the rear end section B'.

C is a side water leg extending vertically downward from the upper part of each section, there being two of these water legs to each section.

C' are dependent legs extending downward from the upper part L of the intermediate sections and being separated from the side water legs C by the flue spaces E which are in direct communication at their lower parts with the combustion chamber H below the hollow grate bars F which form a down draft grate. The grate bars F connect the lower ends of the dependent water legs C' of the sections, and are preferably made integral therewith.

H is a combustion chamber between the grate bars F of the down draft grate and the grate bars I of the up draft grate.

J is the ashpit beneath the up draft grate.

G are flues extending longitudinally through the upper part of the boiler. There are two of these flues, one on each side of the boiler, above the flue spaces E, and each is connected to the flue space E beneath it by the flue D between the side water legs and the dependent water legs of the connecting section A', as shown in Fig. 6.

M is a drain connection whereby the dependent leg C' of each section is connected to the side water leg C. M extends downward from the lower end of C' to the lower end of C and serves not only to prevent the accumulation of mud and dirt in the grate bars F and the lower end of the dependent leg C', but also maintains a circulation between the side water leg C and the dependent leg C'. This connection M is made as thin as is consistent with the proper draining of the legs C' while at the same time maintaining the circulation between C and C'. It is much thinner than the thickness of the section, measured longitudinally of the boiler, as is shown in Fig. 5 which shows an intermediate section A.

M' is a connection of the full thickness of the section in the connecting section A' by which circulation is maintained between the side water leg C and the dependent leg C' of the connecting section. M' serves also as a bottom to the flue D, and being of the full thickness, measured longitudinally of the boiler, of the section, it prevents direct communication between the flue D and the combustion chamber H below the down draft grate.

N is a flue connection by which the longitudinal flue G is connected with the central longitudinal flue K. The door O, attached to the front end section B, serves as the outer wall of the flue N.

P is a smoke outlet in the outlet piece Q attached to the rear end section B'.

R is a door attached to the front end section B through which fuel is fed onto the down draft grate.

$a$ represents nipple openings in which nipples are forced to connect the lower ends of the side water legs C of different sections to allow water to circulate from one section to the other through the boiler.

$a'$ represents nipple openings in which nipples are placed to connect the upper parts of the sections to allow the flow of steam from one section to the other in the upper part of the boiler. The hollow grate bars F are thinner, measured longitudinally of the boiler, than the sections, so that when the sections are put together there will be spaces F' between the grate bars F as shown in Fig. 4.

The intermediate sections A are shown in Fig. 5, and the connecting section A' is shown in Fig. 6. The space E extends from below the grate bars F upward so as to separate the side water legs C from the dependent legs C', and the gases enter into this space directly from the combustion chamber H. While I prefer to have the drain connection M, in order to avoid the accumulation of dirt in the dependent legs C', I also make it as thin, measured longitudinally of the boiler, as possible in order to impede as little as possible the direct entrance of the gases from the combustion chamber H into the flue space E, and also so as to interfere as little as possible with the direct radiation of heat from the fire on the up draft grate whose bars are I onto the outer walls of the flue space E.

Fresh coal is fed onto the grate bars F so as to maintain a fire thereon and air is admitted above these bars. As the coal burns the products of combustion therefrom pass downward through the space F' between the grate bars F into the combustion chamber H; and from there they pass outwardly into the flue spaces E and through these to the rear of the boiler into the flues D through which they ascend to the longitudinal flues G. Through these flues the products of combustion pass to the front of the boiler, and then through the flue N into the central longitudinal flue K from which they pass away through the outlet P. Any unburned fuel that may fall from the down draft grate will be caught on the up draft grate and will there be burned. If the air which passes into H through the down draft grate is not sufficient to burn the fuel that drops onto the up draft grate, air may be admitted to the up draft grate I through the ashpit J.

By forming the down draft grate of the hollow grate bars F, which are preferably made integral with the sections, connecting the ends of the dependent water legs C', I am able to secure all the advantages in the way of economy of combustion and prevention of smoke that usually accompanies a down draft grate, together with a very large amount of heating surface exposed to the direct action of radiation from the lower grate as well as from the upper grate. Further, the drain connections between the side water legs and the dependent water legs insure a very rapid circulation of water through the parts of the boiler exposed to the heat of the fires. The grate bars being made integral with the sections, one grate bar to each section, enables me to provide a down draft grate in the boiler without any further expense than that required for putting the sections together.

I prefer to run the up draft grate bars longitudinally of the boiler, as shown, as they will then be at right angles to the down draft grate bars F which run transversely of the boiler. The flue spaces E extend below the bottom of the down draft grate bar F as far as possible so as to have as direct a connection as possible with the combustion chamber H; and the drain connections M are formed so as to interfere as little as possible with the flow of gases from the combustion chamber into these flue spaces.

What I claim as new and desire to secure by Letters Patent, is:

1. A sectional heating boiler comprising joined end and intermediate sections with vertical side water legs, dependent water legs shorter than and intermediate of and of the same width as said side water legs, a down draft grate formed of hollow grate bars connecting the lower ends of said dependent water legs, and drain connections thinner than said intermediate sections between the lower ends of said dependent water legs and said side water legs, and having smoke flues connected with the space beneath said down draft grate whereby the smoke is made to pass through said sections, substantially as described.

2. A sectional heating boiler comprising joined end and intermediate sections with vertical side water legs, dependent water legs shorter than and intermediate of and of the same width as said side water legs, a down draft grate formed of hollow grate bars made integral with and connecting said dependent water legs, drain connections thinner than said intermediate sections between the lower ends of said dependent water legs and said side water legs, and having smoke flues extending longitudinally of said boiler through the upper part thereof, said flues being connected at the rear end of said boiler with the spaces on each side of said boiler between said dependent water legs and said side water legs, substantially as described.

3. A sectional heating boiler comprising joined end and intermediate sections with vertical side water legs, dependent water legs shorter than and intermediate of and of the same width as said side water legs, a down draft grate formed of hollow grate bars made integral with and connecting the lower ends of said dependent water legs, and an up draft grate below said down draft grate, and having smoke flues connected with the space between said down draft and up draft grates whereby the smoke is made to pass through said sections, substantially as described.

4. A sectional heating boiler comprising joined end and intermediate sections with vertical side water legs, dependent water legs shorter than and intermediate of and of the same width as said side water legs, a down draft grate formed of hollow grate bars made integral with and connecting the lower ends of said dependent water legs, drain connections thinner than said intermediate sections between the lower ends of said dependent water legs and said side water legs, and an up draft grate below said down draft grate, and having smoke flues extending longitudinally of said boiler through the upper part thereof, said flues being connected at the rear end of said boiler with the spaces on each side of said boiler between said dependent water legs and said side water legs, substantially as described.

5. In a sectional heating boiler, a section comprising a body with vertical side water legs, two dependent water legs shorter than and intermediate of and of the same width as said side water legs, a hollow grate bar made integral with and connecting the lower ends of said dependent water legs, drain connections thinner than said section whereby the lower end of each of said dependent water legs is connected with the side water leg adjacent thereto, and having flue openings extending longitudinally through said body, substantially as described.

In testimony whereof I have signed my name to this specification in the presence of two subscribing witnesses.

ALFRED G. CRIPPS.

Witnesses:
W. T. VAUGHAN,
JENNIE SWAN.